United States Patent [19]
Chen et al.

[11] Patent Number: 5,850,530
[45] Date of Patent: Dec. 15, 1998

[54] METHOD AND APPARATUS FOR IMPROVING BUS EFFICIENCY BY ENABLING ARBITRATION BASED UPON AVAILABILITY OF COMPLETION DATA

[75] Inventors: Wen-Tzer Thomas Chen, Austin, Tex.; Richard Allen Kelley, Apex, N.C.; Danny Marvin Neal, Round Rock, Tex.

[73] Assignee: International Business Machines Corporation, Armonk, N.Y.

[21] Appl. No.: 573,680

[22] Filed: Dec. 18, 1995

[51] Int. Cl.⁶ .................................................. G06F 13/00
[52] U.S. Cl. ...................... 395/293; 395/280; 395/287; 364/240; 320/44
[58] Field of Search ................... 395/293, 280, 395/287; 364/240, 242; 320/44, 15, 43, 31, 48

[56] References Cited

U.S. PATENT DOCUMENTS

| | | | |
|---|---|---|---|
| 5,396,602 | 3/1995 | Amini et al. | 395/325 |
| 5,471,590 | 11/1995 | Melo et al. | 395/288 |
| 5,499,346 | 3/1996 | Amini et al. | 395/308 |
| 5,506,997 | 4/1996 | Maguire et al. | 395/800 |
| 5,515,516 | 5/1996 | Fisch et al. | 395/294 |
| 5,524,235 | 6/1996 | Larson et al. | 395/478 |
| 5,528,764 | 6/1996 | Heil | 395/293 |
| 5,535,340 | 7/1996 | Bell et al. | 395/292 |
| 5,546,546 | 8/1996 | Bell et al. | 395/292 |
| 5,548,780 | 8/1996 | Krein | 395/825 |
| 5,550,989 | 8/1996 | Santos | 395/306 |
| 5,555,383 | 9/1996 | Elazar et al. | 395/306 |
| 5,581,782 | 12/1996 | Sarangdhar et al. | 395/800 |

*Primary Examiner*—Ayaz R. Sheikh
*Assistant Examiner*—Eric Thlang
*Attorney, Agent, or Firm*—Mark E. McBurney; Leslie A. Van Leeuwen

[57] ABSTRACT

The present invention provides a system that selectively allows an arbitration cycle to occur only when specific data is ready for transfer. That is, a flag register is provided and its output is ANDed with a bus request signal from a bus device. An arbiter will accept a bus request and initiate an arbitration cycle only when the state of a bit in the flag register indicates that actual completion data exists for the requesting device.

6 Claims, 3 Drawing Sheets

METHOD AND APPARATUS FOR IMPROVING BUS EFFICIENCY BY ENABLING ARBITRATION BASED UPON AVAILABILITY OF COMPLETION DATA

CROSS-REFERENCE TO RELATED APPLICATION

The subject matter of this application is related to application Ser. No. 08/573,681 for "Method And Apparatus For Improving Bus Bandwidth By Reducing Redundant Access Attempts" filed on Dec. 18, 1995, assigned to a common assignee with this application, and incorporated herein by reference.

BACKGROUND OF THE INVENTION

The present invention generally relates to data processing systems having a mezzanine type bus, such as an architecturally specific input/output (I/O) bus, or the like. More specifically, the present invention increases the availability of an I/O bus by eliminating unnecessary attempts to access the I/O bus. Typically in prior art systems, when a busmaster device requests access to a device (e.g. CPU, system memory) on the system bus, if the target device is not ready or cannot meet the initial access latency requirements, then it will terminate the access attempt by issuing a RETRY signal. Access attempts include read operations wherein the requesting device wants to read (or receive) data from, or write data to the targeted device. The result of a RETRY is to cause the busmaster (requesting device to have control of the bus) to attempt the access later, which may also result in termination of the second request by another RETRY signal from the target device. This process can occur a number of times until the access is finally completed. During each access attempt by bus master devices on either the system or I/O bus, a significant amount of time (cycles) is wasted in performing non-productive access attempts. Thus, it can be seen that a reduction in the number of bus access attempts will result in increased bus bandwidth (availability), since the amount of redundant access activity is reduced. Some bus architectures utilize delayed read/write transactions, which by definition will always result initially in a RETRY termination. A delayed read transaction occurs, for example, when a busmaster device on an I/O bus attempts to read information from a targeted device on the system bus. In this case, a host bridge chip, which interfaces the system bus to the I/O bus, transmits the read request from the requesting device to the targeted device. Under the delayed read protocol, the host bridge will initially signal RETRY to the master, but will go ahead and take the necessary steps to access the requested information. The host bridge signals RETRY to the requesting device such that the device must periodically try to complete the read transaction (including arbitrating for control of the I/O bus). Therefore, the requesting device is always required to request the information again, and utilize additional bus cycles by continually arbitrating and repeating the transaction until the transaction completes. The requesting device cannot tell if the RETRY is a simple RETRY, or part of the delayed read protocol. Under the delayed read protocol, the host bridge may (after initially signalling RETRY) obtain the requested data and store it in a buffer. Then, the next time the requesting device implements the read transaction, the data in the buffer is delivered to the requestor and the transaction is completed.

Delayed write transactions are similar to delayed reads, except write information is passed in the initial access, but the transaction does not complete with the transmission of the information. A delayed write transaction occurs when a particular type write operation (such as a PCI I/O write) cannot be posted. Thus, the delayed write information is transmitted from the requesting device to the bridge (such as a PCI—PCI bridge). Using the delayed write protocol, the target device initially issues a RETRY relative to the write transaction, even though the information is accepted in the bridge chip. The targeted device may continually RETRY the access attempt a number of times. Again, each time a RETRY is issued, the transactions must be repeated thereby reducing availability of the bus. A detailed description of the delayed read and write operations are available in the Peripheral Component Interconnect (PCI) Local Bus Specification, Revision 2.1, hereby incorporated by reference.

More particularly, I/O bus protocols, particularly the PCI bus architecture provides for delayed read and delayed write transactions. Delayed read means that a bridge will initially RETRY a read request from a requesting device, thereby indicating to the requesting device that the bridge and/or targeted device is busy and to try the read request again at a later time. Then, unknown to the requesting device, the bridge will go ahead and access the targeted device, obtain the requested data and store it in a buffer in the bridge awaiting the next access attempt by the requesting device. During the time period when the bridge is obtaining the requested data, the requesting device may attempt multiple accesses of the data causing a substantial amount of bus cycles. When the requesting device successfully arbitrates for the bus, and, the requested data is in the host bridge buffer, then the data is provided to the requesting device and the transaction completes.

A delayed write transaction is utilized when the particular write (such as an I/O write) cannot be posted. In this case, the actual write data is buffered in the bridge, however, the transaction cannot complete until it completes on the target destination bus and the device requesting to write the data repeats the original write request. The targeted device (such as a bridge) will initially issue a RETRY and can continually RETRY the write request, thereby causing a significant amount of bus cycles to be used.

Therefore, it can be seen that reducing the number of RETRY control signals will correspondingly reduce the number of arbitration attempts (and therefore bus cycles) such that the bus utilization is optimized. Those skilled in the art will understand that a need exists in the data processing field for a system that causes an I/O bus to be available a greater amount of time.

SUMMARY OF THE INVENTION

In contrast to the prior art, the present invention provides a method and apparatus that improves bus bandwidth utilization by minimizing the amount of redundant bus access attempts.

Broadly, the present invention accomplishes this bus utilization optimization by enabling each target to signal the requesting master when it has completion information in its output buffers. For example, when an I/O device attempts to read data from a system device, a delayed read operation will cause the bridge to signal at least one RETRY to the requesting I/O device. The present invention causes a control signal to be sent from the bridge to the requesting I/O devices when there is completion data in its output buffers. In this manner, the present invention minimizes the multiple RETRY actions by the I/O device, since it will not attempt to obtain the data until it receives the control signal from the bridge.

Further, if a system device attempts to implement a delayed write operation to a targeted device I/O device, the data is initially transferred to the bridge. However, the transaction cannot complete until the targeted device allows the access and, the requesting device repeats the write request. The present invention signals the targeted I/O devices that there is completion data in the bridge output buffer. Also, the present invention causes the targeted device to arbitrate for the bus when the completion data is present, thus minimizing multiple RETRY signals from the targeted device and the multiple arbitration cycles and repeat accesses caused by the requesting device attempting to complete the write transaction.

Of course, it can be seen that the present invention can cause operation of even standard read and write transactions to become more efficient, since redundant bus access attempts will occur only after a control signal is received indicating the existence of completion data.

The present invention utilizes a signal that indicates when there is completion information in the output buffer. Thus, the requesting device will then attempt to gain control of the bus and complete the transaction by arbitrating for the bus, only when it is known that the completion information is actually in the output buffer and ready for transmission.

Further, another embodiment of the present invention provides a system that selectively allows an arbitration cycle to occur only when specific data is ready for transfer. That is, a flag register is provided and its output is ANDed with a bus request signal from a bus device. An arbiter will accept a bus request and initiate an arbitration cycle only when the state of a bit in the flag register indicates that actual completion data exists for the requesting device.

These and other objects, features and advantages will become apparent to those skilled in the art upon considering the subsequent description taken in conjunction with the attached drawings.

DETAILED DESCRIPTION OF THE PREFERRED EMBODIMENTS

Figure 1:
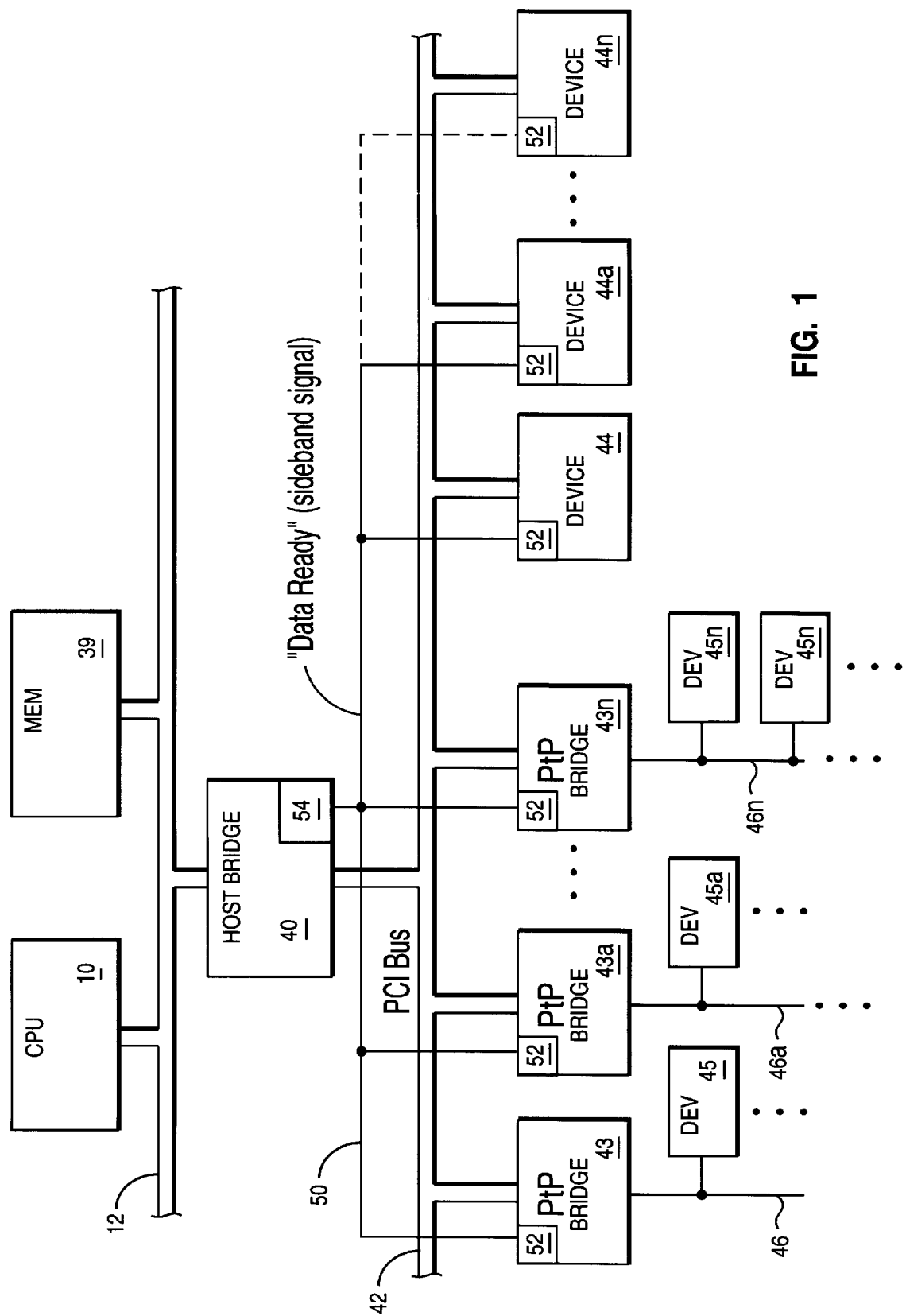
FIG. 1 is a detailed view of the secondary bus and its connection to the system bus, also showing the control signal and corresponding logic of a first preferred embodiment of the present invention.

Referring to FIG. 1, a detailed diagram of the present invention is shown and will now be described. CPU 10 and memory 39 are shown connected to system bus 12 which is in turn connected to host bridge 40. PCI bus 42 interconnects host bridge 40 with the various PCI devices 44 and 44a through 44n. Additionally, PCI to PCI bridge chips 43 and 43a through 43n are shown connected to bus 42. Each of the PCI to PCI bridge chips 43 is capable of supporting another PCI bus 46 and 46a through 46n. These additional PCI buses 46 are capable of attaching and supporting various PCI devices 45 and 45a through 45n such that a computer system will be capable of supporting a large number of input/output devices. It should be noted that a PCI bus is capable of supporting up to ten (10) I/O loads where a slot is considered as two loads and soldered devices are one load. A bridge chip is considered as a single load. Therefore, if a single PCI bus 42 was used in the system, then the number of devices would be limited. However, utilizing PCI to PCI bridge chips 43, which are capable of supporting additional devices on their secondary PCI buses 46, the system is capable of supporting a greater number of devices than would be possible without bridge chips 43.

Read/write control bus signal 50 interconnects control logic 52 in each of the devices 44 and bridge chips 43 with control logic 54 in host bridge 40. The present invention includes issuing a data ready signal from a bus to bus bridge 43 or a device 44 to host bridge 54 when there is completion data in the output buffers of bridges 43 or devices 44, respectively. During a typical operation wherein a device 44 wishes to read data from a system device, such as memory 39, device 44 sends a read request transaction to bridge 40 which places the address of the desired data on PCI bus 42. Typically, a RETRY operation is initially issued in this case by the host bridge. The device 44 will then continually attempt to read the data again and again until no RETRY is encountered and the transaction is completed. However, with the present invention, a single RETRY is issued and the device 44 does not attempt to access the data again until that data is in the output buffer of the host bridge 40. Once in the output buffer, a signal is placed on bus 50 which is received by the device 44. This signal indicates that the data is ready and that device 44 should arbitrate for control of PCI bus 42. It should be noted that the device 44 will not know precisely which bridge chip 43 or host bridge 40 has the data that is to be read, however the device 44 will know that there is some data ready to be received from one of the devices or bridge chips.

Similarly, when host bridge 40 which is to read certain data from one of the devices 44 or bridge chips 43, host chip 40 will arbitrate for the PCI bus and place the address (where the data is to be obtained) on bus 42. If the device which the data is to be read from is busy performing other transactions, a RETRY is sent from the device 44 to the bridge chip 40. In this case, device 44 will output a signal on bus 50 indicating that data is ready for the host bridge 40 connected to bus 42. When the host bridge completes its current transaction processing, the signal from bridge 40 will be decoded and result in an arbitration cycle for the PCI bus 42. Once the bus 42 is granted to the host bridge 40, host bridge 40 will then complete a read transaction with that particular device or bridge chip.

Figure 2:
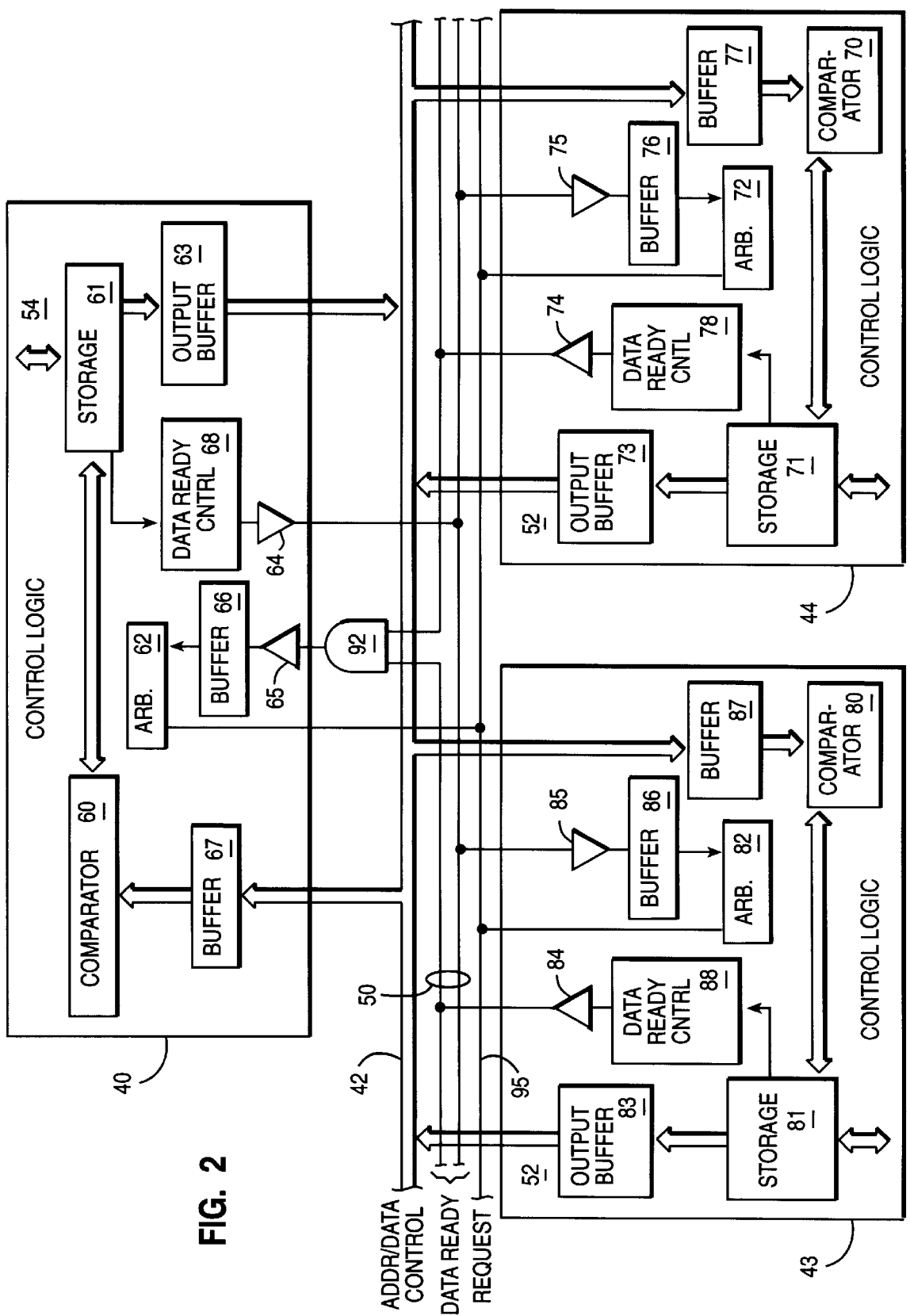
FIG. 2 is a schematic diagram illustrating in detail, the control logic present on the host bridge and secondary bus devices which cause the data ready signal of the present invention to be issued and recognized.

FIG. 2 is a detailed schematic diagram showing the components of control logic 54 and 52 for the host bridge and various bridge chips 43 or PCI devices 44. It should be noted that control logic 52 and 54 is identical to one another, however, different reference numerals have been used for the various components to avoid confusion.

Control logic 54 includes a storage device 61, such as a cache, or the like, which stores various binary information including data and instructions. Storage device 61 is utilized to store inbound and outbound delayed transactions which are awaiting a repeat of accesses previously "Retried". Additionally, storage device 61 is connected to output buffer 63 which stores the next sequential information to be output to I/O devices 44, or the like via I/O bus 42. I/O bus 42 transmits address and data information between host bridge 40 and I/O bridge 43 and device 44. Data ready control 68 detects that a delayed transaction (such as delayed read) is ready for completion (data ready) and drives output driver 64 to signal that data is ready in the host bridge, i.e. buffer 63. Comparator 60 is interconnected to storage device 61 and an input buffer 67 and compares the address for data on bus 42 with the address of data which is to be accessed from storage device 61, as described in more detail below. Arbiter 62 is provided which arbitrates for ownership (control) of bus 42. Driver 64 and receiver 65 are provided to amplify the signals sent to and received from Data Ready signal bus 50.

Similarly, control logic 52 in device 44 includes a storage device 71, such as a cache, buffer, or the like, which stores various binary information including data and instructions. Storage device 71 is utilized to store inbound and outbound delayed transactions which are awaiting a repeat of accesses previously "Retried". Data Ready Control 78 detects that a delayed transaction (such as a Delayed Read) is ready for completion (i.e. data ready) and drives the output driver 74 to signal that data is ready in data providing device, e.g. buffer 73 of I/O device 44. Additionally, storage device 71 is connected to output buffer 73 which stores the next sequential data to be output to system memory 39, or the like via I/O bus 42. Bus 42 transmits address and data information between host 40 and I/O device 44. Comparator 70 is interconnected to storage device 71 and an input buffer 77 and compares the address for data on bus 42 with the address of data which is to be accessed from storage device 71, as described in more detail below. Arbiter 72 is provided which arbitrates for ownership of bus 42. Driver 74 and receiver 75 are provided to amplify the signals sent to and received from Data Ready control signal bus 50.

Control logic 52 in bus to bus bridge 43 includes a storage device 81, such as a cache, buffer, or the like, which stores various binary information including data and instructions. Storage device 81 is utilized to store inbound and outbound delayed transactions which are awaiting a repeat of accesses previously "Retried". Storage device 81 may also buffer data to be input to I/O devices 45 from system components (e.g. memory 39) via bridges 40 and 43. Additionally, storage device 81 is connected to output buffer 83 which stores the next sequential data to be output to system memory 39, or the like via I/O bus 42 and host bridge 40. Bus 42 transmits address and data information between host 40 and I/O bridge 43. Data ready control 88 detects that a delayed transaction (such as delayed read) is ready for completion (data ready) and drives output driver 84 to signal that data is ready in the data outputting device, e.g. buffer 83 of I/O device 43. Comparator 80 is interconnected to storage device 81 and an input buffer 87 and compares the address for data on bus 42 with the address of data which is to be accessed from storage device 81, as described in more detail below. Arbiter 82 is provided which arbitrates for ownership of bus 42. Driver 84 and receiver 85 are provided to amplify the signals sent to and received from read/write control signal bus 50.

Also referring to FIG. 2, the operation of a first preferred embodiment of the present invention now will be described. As a first example, assume that a read operation is to occur wherein host bridge 40 is going to provide read data to device 44. In the case of a delayed read transaction the actual data is transferred from system memory to storage device 61 in host 40 via bus 12. Once in storage device 61, control logic 54 then places the data to be read by device 44 in output buffer 63. Typically, device 44 would send a read request to host bridge 54 which could continually RETRY this request a number of times. This causes the device to correspondingly arbitrate for control of the bus (when it subsequently tries again to complete the transaction), thereby using a significant amount of bus bandwidth (cycles). However, in accordance with the present invention, host bridge 54 will issue fewer RETRYs. Next, control logic 54 issues a sideband Data Ready signal onto bus 50 through driver 64. This signal is generated by any number of methods which are well known in the art, such as monitoring content of storage 61 by Data Ready control logic 68 to determine when data is ready to be provided to requesting device 52. If read data is available as with this example, then control logic 54 knows that there is data in the storage device 61 to be provided to one of the I/O devices. Next, once data is available in the storage device 61, the sideband control signal is broadcast to all I/O devices connected to Data Ready bus 50. For this example, the data ready control signal is received in device 44 by receiver 75 and then placed in buffer 76. It should be noted that the Data Ready signal from driver 64 is also received in receiver 85 and placed in buffer 86 of bridge 43, or any other I/O devices connected to bus 50. The Data Ready control signals in buffers 76 and 86 are then provided to arbitration circuits 72 and 82 which begin an arbitration cycle, on arbitration bus 95, for control of bus 42. Continuing with the present example, it is assumed that device 44 successfully arbitrates for control of bus 42. At that time, the data in storage device 61 is then read from bus 42 by device 52 completing the read transaction.

Therefore, in the case of a read transaction, host bridge 40 will broadcast the fact that there is read completion data in its storage device 61 for one of the I/O devices (device(s) 44 or bridge(s) 43 from FIG. 2), but does not specify which specific I/O device. In this manner, issuance of multiple RETRY signals by a targeted I/O device, host bridge, or PCI—PCI bridge is reduced. Arbitration after a previous retry to a specific device will occur by that same device only when there is actual data to be accessed by that same I/O device. In this manner, bus bandwidth is optimized since arbitration cycles and repeated access attempts are minimized.

Figure 3:
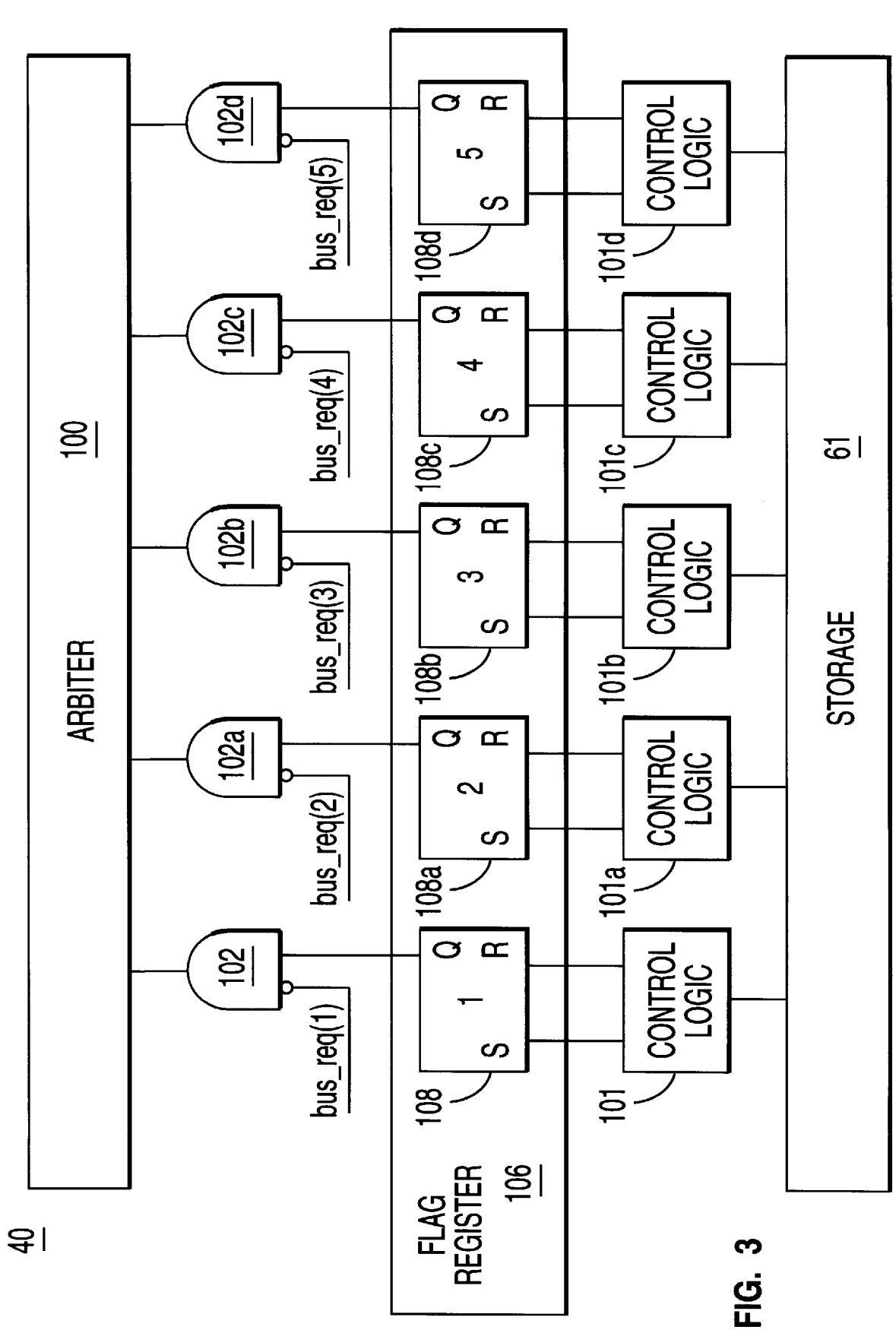
FIG. 3 is a schematic diagram of another preferred embodiment of the present invention wherein arbitration for the bus is regulated.

Referring to FIG. 3, another preferred embodiment will now be described. As noted previously, delayed read and write transactions allow the targeted devices to initially (and continually) signal RETRY, thus causing the requesting device to attempt multiple bus accesses (through arbitration) until the requested transaction is completed. This can cause an unacceptably high amount of bus cycles to be used, due to the repeated access attempts. Thus, a system that selectively allows an arbitration cycle to occur only when the requesting device's data is ready for transfer would be advantageous. Further, as will be described in more detail below, the present invention with this second embodiment will eliminate unnecessary redundant RETRY transactions from a requesting device and will improve the efficiency/utilization of the bus.

As shown in FIG. 3, an arbiter 100 is included in host bridge 40. It should be noted that this embodiment will be described relative to host bridge 40, however, the present invention will apply equally to a bus to bus bridge, such as bridge 43. Also note that this second embodiment is dependent on the devices attached to the bridge allowing only one outstanding read request per device at a time. As a result, the ability to selectively disable each and gate 102 should be included. This would allow disabling this function for a PCI—PCI bridge or multi-function device which may have the capability to have more than one outstanding delayed read request.

In bridge 40, flag register 106 is added which includes set/reset buffers 108, and 108a through 108d. Buffers 108 include a set bit "S" and reset bit "R" which are activated depending on the state of the transaction. These bits are set by control logic 101 (and 101a through 101d, respectively) in bridge 40 based on the presence of the requested data in storage 61. Between flag register 106 and arbiter 100 are "AND" gates 102 and 102a through 102d. Of course, the number of AND gates 102 and buffers 108 will vary, depending on the number of devices 44 connected to the bridge 40 via bus 42.

The operation of the next preferred embodiment, as shown in FIG. 3 will now be described. For example, assume that a device 44 (see FIG. 2) desires to read data from system memory 39. Also, for the purposes of this example, device 44 will correspond to bus_req(1) and flag register 108 in FIG. 4. Initially, device 44 sends a read request to host bridge 40, which returns a RETRY to the requesting device 44. The requesting device 44 will then continually try and arbitrate for the bus 42 and try the access repeatedly, thus using a significant amount of bus bandwidth. However, this second embodiment of the present invention as shown in FIG. 3, will cause the set bit in buffer 108 to be activated for devices having outstanding delayed transactions being serviced by the bridge. This bit is set by control logic 101 (and 101a–101d) in bridge 40 when the request, e.g. the read request from device 44, cannot be satisfied and bridge 40 is capable of completing the transaction. That is, bridge 40 is considered to be capable of completing the transaction when its storage unit (e.g. storage unit 61 of FIG. 2) contains the read data requested by device 44. In the current example the bit "S" in buffer 108 is at, e.g. a logical zero ("0"). The control signal from device 44 which requests control of bus 42 (by arbitration), e.g. bus_req(1), is a negative active signal, such that its active state is at logical "0" and its inactive state is at logical one ("1"). When device 44 attempts to access the bus again by initiating an arbitration cycle, it will drive the bus_req(1) signal low (to zero). This signal is inverted when input to AND gate 102. Thus, if the bridge 40 is not capable of completing the transaction (e.g. system memory 39 has not provided the data to the buffer in the bridge), then the bus_req(1) signal will not cause arbiter 100 to initiate an arbitration cycle. In other words, arbiter 100 will only initiate another arbitration cycle for this device when bridge 40 is capable of completing the transaction, e.g. the data for device 44 is available. This is because the inverted bus_req(1) signal input to gate 102 AND the logical "0" for the set signal will produce a logical "0" output to arbiter 100, thereby preventing an arbitration cycle from occurring. However, once bridge 40 is capable of completing the transaction, the bit in buffer 108 will be "reset" to a logical "1". This indicates that completion data exists in the buffer of bridge 40 for the subject device and the next time device 44 successfully arbitrates for bus 42, the transaction can be completed. Thus, when device 44 activates the bus_req(1) signal, a logical "1" is input to and gate 102. Concurrently, the logical "1" from the "reset" bit in buffer 108 is also input to AND gate 102. In this manner, a logical "1" is output to arbiter 100 and an arbitration cycle is run. Assuming that device 44 successfully gains control of bus 42, the transaction is completed by transferring the requested data from bridge 40 to device 44.

Thus, it can be seen how this preferred embodiment of the present invention regulates the number of arbitration cycles by ensuring that arbitration will only occur when there is actually completion information in the output buffers of the bridge.

As a general example, assume device 44 initiates a read request. Bridge 40 decodes the address and looks for data associated with the address in its storage unit. If the data is available in the buffer, the read request can be satisfied immediately by reading data from storage unit. The bus cycle for the read transaction will be completed when data is transferred successfully to the requesting device 44. On the other hand, the bridge will try to allocate a buffer if data cannot be found in the bridge. If a buffer for storing read information is successfully allocated for the read transaction, the bridge will attempt to complete the read transaction for the device 44 by initiating a read request on the system bus 12. At the same time, the bit in buffer 108 of flag register 106 will be set to indicate that an outstanding request from device 44 is being serviced by the bridge 40. Also, the RETRY signal is posted to notify device 44 that the read transaction cannot be fulfilled at this time. Upon detecting the RETRY signal, device 44, can immediately RETRY the failed read request by rearbitrating for the bus. The bus_req(1) is now active. The arbiter 100 would ignore this bus request in the subsequent arbitration cycles. In this case, the bus_req1) signal remains active. When the read transaction that is being attempted by bridge 40 for device 44 is completed on the system bus, i.e. the data is now available in the bridge buffer, the bridge 40 resets the bit in buffer 108 of flag register 102 to a logical "1". On the next arbitration cycle (unless there are other higher priority devices participating in the arbitration), the bus is granted to device 44, which then proceeds to complete the read transaction.

Although certain preferred embodiments have been shown and described it should be understood that many changes and modifications can be made therein without departing from the scope of the appended claims.

We claim:

1. A data processing system having a bridge for interconnecting a first bus with a second bus, comprising:

a plurality of I/O devices connected to said second bus;

a bridge storage unit, included in said bridge, for storing information to be transmitted to one of said plurality of I/O devices; and means, within said bridge, for regulating access to said second bus by preventing an arbitration cycle from occurring until said information is present in said bridge storage unit, wherein said means for regulating access further includes:

means for arbitrating for control of said second bus by said plurality of I/O devices and said bridge; and means for determining whether one of said plurality of I/O devices can initiate arbitration for control of said second bus, wherein said means for determining further includes:

means for receiving a bus access request control signal from at least one of said plurality of I/O devices;

means for determining whether said information is in said bridge storage unit; and means for enabling arbitration when said information is in said bridge storage unit.

2. A system according to claim 1 wherein said means for enabling comprises:

means for storing a flag bit indicative of the presence of said information in said bridge storage unit; and an AND gate for outputting an arbitration control signal to said means for arbitrating when said bus access request control signal is present and said flag bit is active.

3. A system according to claim 2 wherein said means for enabling further comprises control means for setting a status of said flag bit dependent upon a presence of said information in said bridge storage unit.

4. A method of interconnecting, via a bridge, a first bus with a second bus, comprising the steps of:

connecting a plurality of I/O devices to said second bus;

storing information to be transmitted to one of said plurality of I/O devices in a bridge storage unit, included in said bridge; and regulating access to said second bus by preventing an arbitration cycle from occurring until said information is present in said bridge storage unit, wherein said step of regulating access further includes the steps of:

arbitrating for control of said second bus by said plurality of I/O devices and said bridge; and determining whether one of said plurality of I/O devices can initiate arbitration for control of said second bus, wherein said step of determining whether one of said plurality of I/O devices can initiate arbitration further includes the steps of:

receiving a bus access request control signal from at least one of said plurality of I/O devices;

determining whether said bridge information is in said bridge storage unit; and enabling arbitration when said bridge information is in said bridge storage unit.

5. A method according to claim 4 wherein said step of enabling comprises the steps of:

storing a flag bit indicative of the presence of said bridge information in said bridge storage unit;

performing an AND operation between said bus access request control signal and said flag bit; and outputting an arbitration control signal when said bus access request control signal is present and said flag bit is active.

6. A method according to claim 5 wherein said step of enabling further comprises the step of setting, by control logic in said bridge, a status of said flag bit dependent upon a presence of said information in said bridge storage unit.

* * * * *